Aug. 6, 1940.　　　H. E. TAUTZ ET AL　　　2,210,135
SHAPER GUARD
Filed June 19, 1937　　　2 Sheets-Sheet 1

WITNESSES
L. E. Kilian
C. L. Waal

INVENTORS
Herbert E. Tautz
Paul E. Butzin
By R. S. Caldwell
ATTORNEY

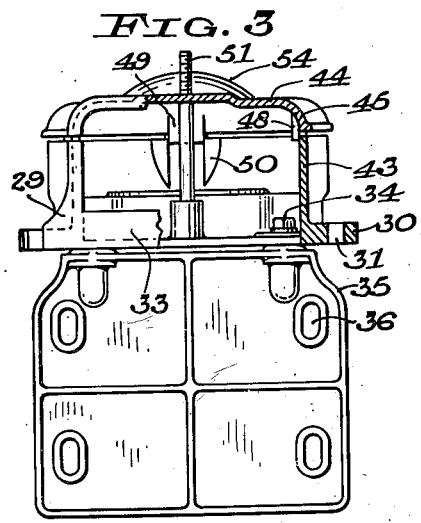

Patented Aug. 6, 1940

2,210,135

UNITED STATES PATENT OFFICE 2,210,135

SHAPER GUARD

Herbert E. Tautz and Paul E. Butzin, Milwaukee, Wis., assignors to The Delta Manufacturing Company, Milwaukee, Wis., a corporation of Wisconsin Application June 19, 1937, Serial No. 149,130

5 Claims. (Cl. 74—611)

The invention relates to machinery guards and more particularly to guards and motor mountings for shaper drives and the like.

An object of the invention is to provide improved guard means of simple, neat and inexpensive construction for enclosing and adequately protecting the belt drive of a bench shaper or other machine.

Another object of the invention is to provide a combined guard and motor mounting which is capable of simple attachment to the flat top of a tabular support carrying the machine and which is readily shiftable along the flat top to adjust the belt drive.

A further object is to provide guard means which will permit easy access to the belt drive and driven member.

The invention further consists in the several features hereinafter described and claimed.

An embodiment of the invention is illustrated in the accompanying drawings, wherein Fig. 1 is a side elevation of a bench shaper equipped with guard and motor mounting means of the invention, parts being broken away and parts being shown in section;

Fig. 3 is an end view of a motor-mounting guard member, parts being omitted and broken away and parts being shown in section;

Fig. 4 is a top plan view of the motor-mounting guard member, a cover plate thereof being omitted;

Fig. 5 is a bottom plan view of a cover plate for the motor-mounting guard member;

Fig. 6 is an elevation of a spindle pulley guard member;

Fig. 7 is a bottom plan view of the spindle pulley guard member, and

Fig. 8 is a detail sectional view taken along the line 8—8 of Fig. 1.

Figure 1:
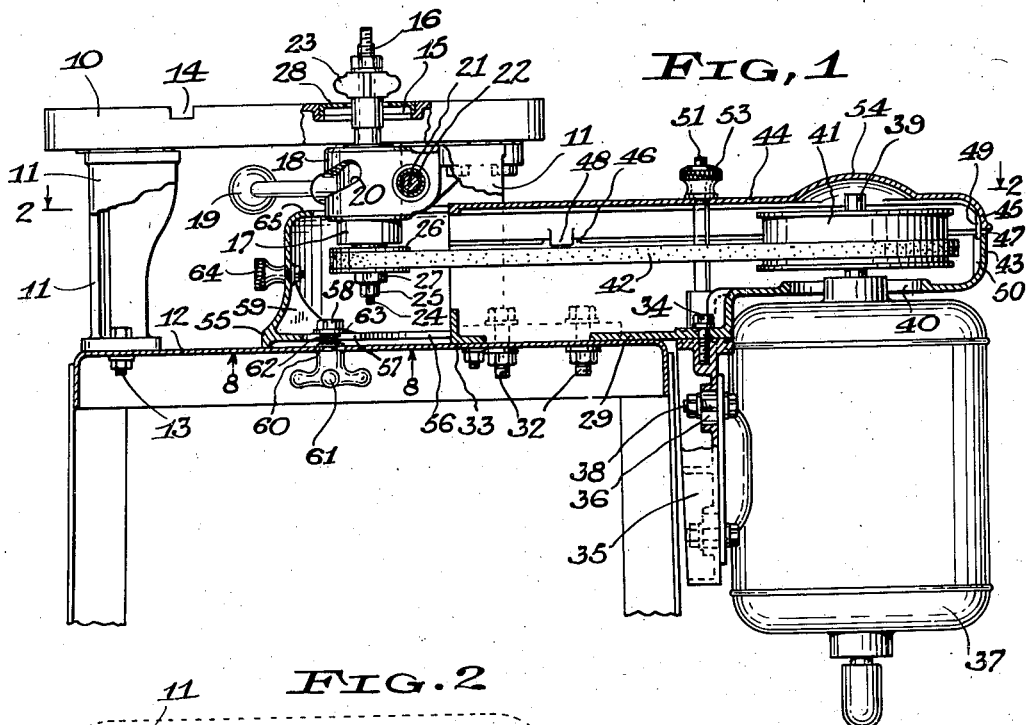
Figure 2:
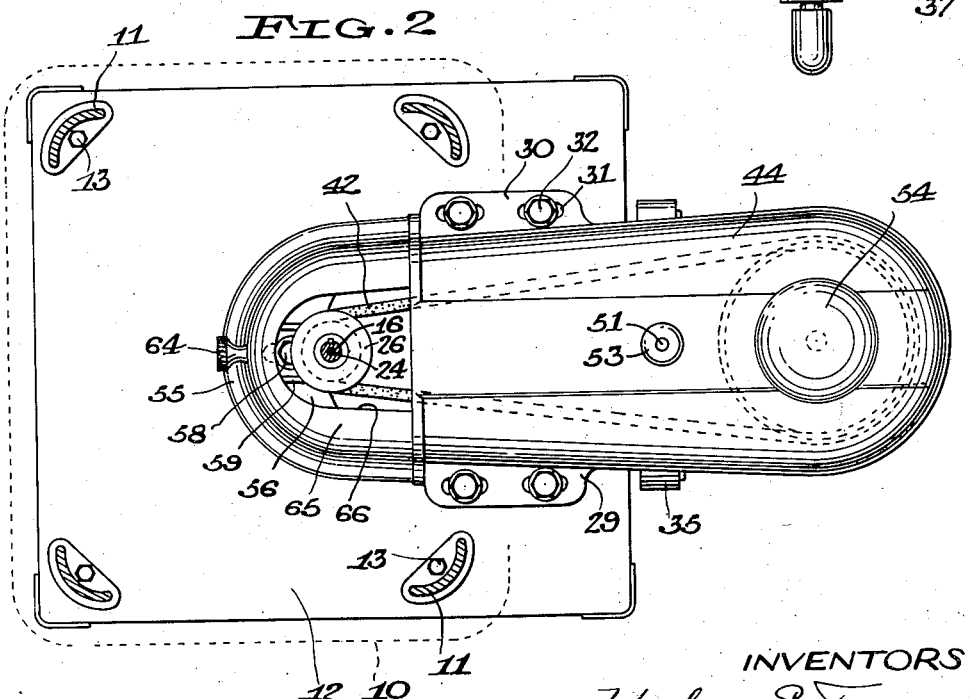
Fig. 2 is a sectional view taken generally along the line 2—2 of Fig. 1.

In these drawings, 10 designates a shaper table provided with legs 11 resting on the flat top surface of a legged stand or bench 12 to which they are secured by bolts 13. The shaper table is further provided with a gage-guiding groove 14 and a rabbeted opening 15 adapted to receive therethrough a vertical shaper spindle 16. The spindle is slidably and rotatably supported in any suitable manner, and is here shown to be journalled in a quill 17 vertically slidable in a housing 18 which is secured to the bottom face of the table. The quill is raised and lowered as by means of an arm 19 secured thereto and passing through a helical cam slot 20 in the housing, and the quill is clamped in position by suitable means including a clamping rod 21 and surrounding clamping tube 22. The spindle preferably comprises a hollow main spindle member and an auxiliary spindle member which latter carries a detachable cutter 23 and is interchangeable with other spindle members, being detachably secured to the main spindle member by a stud 24 and a nut 25. A grooved pulley 26 is keyed on the lower end of the main spindle member and is clamped thereon by a nut 27, the pulley being above the plane of the bench top and having its axis perpendicular to this plane. The rabbeted table opening 15 is preferably provided with a removable apertured insert 28 through which the auxiliary spindle member extends. The shaper construction thus far described is similar to that shown in United States Patent 2,045,422, issued June 23, 1936, to Herbert E. Tautz.

A guard member or bracket 29 has a flat bottom or base portion slidably resting on the flat top surface of the stand or bench 12 and is provided with flanges 30 at opposite sides having slots 31 to receive bolts 32 which adjustably clamp the guard member to the bench. The side portions of the guard member nearest the spindle are joined by an angle shaped tie bar 33. The inner end of the guard member 29 extends between legs 11 of the shaper table and the outer end overhangs an edge of the bench and has secured thereto by screws 34 a downwardly projecting motor mounting plate 35 provided with screw-receiving slots 36, the plate being adjacent an edge of the bench and extending below the plane of the bench top. An electric motor 37 is adjustably secured to the mounting plate 35 by screws 38 passing through the slots 36 and has a vertical shaft 39 parallel to the shaper spindle and passing through an opening 40 formed in an elevated bottom portion of the guard member. The motor shaft 39 carries a wide-faced flanged pulley 41, which is drivingly connected to the spindle pulley 26 by a V-belt 42, the belt having a side-driving engagement with the spindle pulley. The guard member 29 is provided with an upstanding marginal flange 43 to enclose the belt drive. The top portion of the guard member is preferably formed by a detachable cover plate 44 having a downwardly projecting marginal flange 45 resting on side lugs 46 and an end lug 47 formed on the guard member flange 43. The cover plate is positioned by means of side lugs 48 and an end lug 49 which project downwardly to engage the inner face of the guard member flange 48, the end lug 49 being confined between shoulders 50 formed on the guard member flange. An upstanding stud 51 is secured to the central portion of the guard member and passes through an opening 52 in the cover plate. A thumb nut 53 is screwed onto the stud to hold the cover plate in place. A dome-shaped projection 54 on the cover plate affords clearance for the upper end of the motor shaft.

A pulley guard 55 detachably encloses the spindle pulley and forms a continuation of the guard member 29 and its cover plate. The pulley guard 55 rests on the flat top surface of the stand or bench 12 and is provided with a bottom web 56 having a slot 57 to receive a clamping screw 58, there being vertical stiffening flanges 59 on opposite sides of the slot 57. The screw 58 passes through a slot 60 in the bench top, Figs. 1 and 8, and has flattened sides, Fig. 8, engaging the edges of the slot to prevent relative rotation. A hand nut 61 engages the screw below the bench, and a coiled spring 62 surrounding the screw above the bench top engages washers 63 on the screw and urges the screw upwardly to facilitate placement of the pulley guard into guarding position. A knob 64 on the pulley guard permits easy detachment and replacement of the guard. The upper portion of the pulley guard has an inturned flange 65 forming a slot 66 to admit the lower end of the spindle housing 18.

The tension on the belt 42 is adjusted by sliding the motor-carrying guard member 29 in or out along the flat top of the bench 12 with the screws 32 slightly loosened, these screws then being tightened to preserve the adjustment and to clamp the guard member firmly in place. Replacement of the belt is readily effected by removing the pulley guard 55 and cover plate 44, and readjusting the motor-carrying guard member. The slidable mounting of the pulley guard 55 on the bench top permits this guard to be brought close to the motor-carrying guard member in all adjustments of the latter member. The pulley guard is quickly removable and replaceable so as to facilitate the changing of the shaper spindles. To remove the pulley guard the hand nut 61 is loosened and the guard is drawn outwardly by its knob 64, the guard sliding on the flat top of the bench 12. To replace the pulley guard is equally simple.

The flat top of the bench or other tabular support on which the machine is mounted presents an aligning surface to insure proper positioning of the guards with respect to each other and to the pulley of the machine.

When the shaper is in use, the guard adequately encloses and protects the belt drive of the shaper, so as to prevent injury to nearby persons and also to prevent damage to the belt drive by objects falling or moving in the vicinity of the shaper. The guard also forms an adjustable mounting for the driving motor of the machine, permitting ready adjustment of the belt tension. The guard does not interfere with the vertical adjustment of the shaper spindle by the arm 19. During such adjustment the belt shifts laterally on the wide-faced motor pulley 41, but remains enclosed within the guard means.

What we claim as new and desire to secure by Letters Patent is:

1. The combination, with a tabular support having a flat top, and a machine resting on and secured to said flat top and having a pulley above the plane of said flat top, of a guard having a base portion resting on said flat top, means for releasably clamping said guard to said flat top, a motor carried by said guard and having a shaft with a pulley, and a belt connecting said motor pulley and machine pulley, said guard having wall portions for enclosing said belt and motor pulley, and said guard being slidably shiftable along the flat top of said support to adjust the belt tension.

2. The combination, with a tabular support having a flat top, and a machine resting on and secured to said flat top and having a pulley above the plane of said flat top, of a guard having a base portion resting on said flat top, means for releasably clamping said guard to said flat top, a motor carried by said guard and having a shaft with a pulley, a belt connecting said motor pulley and machine pulley, said guard having wall portions for enclosing said belt and motor pulley, and said guard being slidably shiftable along the flat top of said support to adjust the belt tension, and a pulley guard for said pulley resting on and releasably secured to the flat top of said support and forming a separable continuation of said motor-carying guard, said pulley guard being slidably shiftable along said flat top to bring said guard into and out of guarding position.

3. The combination, with a tabular support having a flat top, and a machine resting on and secured to said flat top and having a pulley above the plane of said flat top and arranged with its axis of rotation perpendicular to said plane, of a guard having a base portion resting on said flat top, means for releasably clamping said guard to said flat top, a motor carried by said guard with its shaft parallel to said pulley axis, said motor shaft having a pulley, and a belt connecting the motor pulley and machine pulley, said guard having hood-forming walls enclosing said belt and motor pulley, and said guard being slidably shiftable along the flat top of said support to adjust the belt tension.

4. The combination, with a tabular support having a flat top, and a machine resting on and secured to said flat top and having a pulley above the plane of said flat top and arranged with its axis of rotation perpendicular to said plane, of a guard having a base portion resting on said flat top, means for releasably clamping said guard to said flat top, said guard having a portion overhanging the flat top of said support and provided with a downwardly projecting part, a motor secured to said downwardly projecting part and having a vertical shaft with a pulley thereon extending above the plane of the flat top of said support, and a belt connecting said motor pulley and machine pulley, said guard having a hood portion enclosing said belt and said motor pulley, and said guard being shiftable along the flat top of said support to adjust the tension of the belt.

5. The combination, with a tabular support having a flat top, and a machine resting on and secured to said flat top and having a pulley above the plane of said flat top and arranged with its axis of rotation perpendicular to said plane, of a guard for said pulley comprising a laterally opening housing shell extensible about said pulley and having a bottom portion resting on said flat top, and releasably secured to said flat top, said guard being slidably shiftable on said flat top to place said guard into and out of pulley-guarding position.

HERBERT E. TAUTZ.
PAUL E. BUTZIN.